United States Patent
Hammerschmidt (10) Patent No.: US 10,739,368 B2
(45) Date of Patent: Aug. 11, 2020

(54) INCREMENTAL SPEED SENSOR WITH REDUNDANT SENSOR ELEMENTS

(71) Applicant: Infineon Technologies AG, Neubiberg (DE)

(72) Inventor: Dirk Hammerschmidt, Finkenstein (AT)

(73) Assignee: Infineon Technologies AG (DE)

( * ) Notice: Subject to any disclaimer, the term of this patent is extended or adjusted under 35 U.S.C. 154(b) by 425 days.

(21) Appl. No.: 15/598,568

(22) Filed: May 18, 2017

(65) Prior Publication Data

US 2018/0335441 A1 Nov. 22, 2018

(51) Int. Cl.
*G01P 3/44* (2006.01)
*G01P 3/488* (2006.01)
(Continued)

(52) U.S. Cl.
CPC .................. *G01P 3/44* (2013.01); *G01D 5/12* (2013.01); *G01P 3/487* (2013.01); *G01P 3/488* (2013.01);
(Continued)

(58) Field of Classification Search
CPC ........... G01D 5/12; G01P 3/44; G01R 31/041; G01R 33/09; G03B 17/561; H01L 2924/1305
(Continued)

(56) References Cited

U.S. PATENT DOCUMENTS 4,629,948 A * 12/1986 Tassinario ............... G01P 3/487
310/113
6,291,989 B1 9/2001 Schroeder
(Continued)

FOREIGN PATENT DOCUMENTS

DE 10039354 A1 4/2001
WO 2012134751 A1 10/2012

OTHER PUBLICATIONS

Fraden, Jacob. Handbook of Modern Sensors. Physics, Design, and Applications, 5th Edition, Springer International Publishing Switzerland, Oct. 16, 2015, pp. 1-758. [Retrieved from the Internet Oct. 21, 2019] URL: <https://fajarahmadfauzi.files.wordpress.com/2015/12/sensor.pdf>.

*Primary Examiner* — Melissa J Koval
*Assistant Examiner* — Trung Nguyen
(74) *Attorney, Agent, or Firm* — Design IP (57) ABSTRACT

Magnetic sensor modules, systems and methods are provided, configured to detect a rotation speed of an object. A magnetic sensor module includes a plurality of sensor elements configured to generate measurement values in response to sensing a magnetic field, the plurality of sensor elements being grouped into three pairs; and a sensor circuit configured to generate a first shifted differential measurement signal based on the measurement values received from a first shifted pair of sensor elements, a central differential measurement signal based on the measurement values received from a central pair of sensor elements, and a second shifted differential measurement signal based on the measurement values received from a second shifted pair of sensor elements, and generate an output signal based on detecting the first shifted differential measurement signal, the central differential measurement signal, and the second shifted differential measurement signal crossing at least one threshold.

22 Claims, 8 Drawing Sheets

(51) Int. Cl.
*G01P 3/487* (2006.01)
*G01D 5/12* (2006.01)
*G01D 5/244* (2006.01)
*G01D 5/245* (2006.01)
*G01D 5/14* (2006.01)

(52) U.S. Cl.
CPC .......... *G01D 5/147* (2013.01); *G01D 5/2451* (2013.01); *G01D 5/24476* (2013.01)

(58) Field of Classification Search
USPC ............. 324/200, 207.13, 207.14, 242–247, 324/207.23–207.25, 500, 529, 530, 545, 324/600, 631, 160, 167, 76.11, 86, 110, 324/137, 154 R
See application file for complete search history.

(56) References Cited

U.S. PATENT DOCUMENTS

| | | | |
|---|---|---|---|
| 2011/0244599 A1* | 10/2011 | Whig | B82Y 25/00 438/3 |
| 2012/0303305 A1* | 11/2012 | Bergqvist | G01D 5/2208 702/65 |
| 2013/0106326 A1 | 5/2013 | Kamatani et al. | |
| 2015/0061656 A1 | 3/2015 | Fernandez et al. | |
| 2018/0364066 A1* | 12/2018 | Satz | G01D 5/12 |
| 2019/0107587 A1* | 4/2019 | Stewart | G01R 33/07 |
| 2019/0277874 A1* | 9/2019 | Hainz | G01P 3/481 |
| 2019/0339340 A1* | 11/2019 | Hainz | G01R 33/091 |
| 2019/0353677 A1* | 11/2019 | Lim | G01D 5/246 |

\* cited by examiner

INCREMENTAL SPEED SENSOR WITH REDUNDANT SENSOR ELEMENTS

FIELD

The present disclosure relates generally to sensing a rotation speed, and, more particularly, to magnetic speed sensors.

BACKGROUND

Magnetic field sensors are widely used in incremental speed and position measurement. They detect changes in a magnetic field that is caused by a moving or rotating magnetic encoder.

For example, to measure a wheel speed (e.g., in an automotive application) typically an encoder wheel is used in combination with a magnetic sensitive sensor. The sensor generates an output signal based on a sensed magnetic field that oscillates between two extrema (e.g., a minimum and maximum) in accordance with the rotation of the encoder wheel. A control unit is able to calculate a wheel-speed and an actual angle of the rotating encoder wheel based on the output signals generated by the sensor.

The measurement of the sensed magnetic field may be done differentially between two magnetic field sensor elements of the sensor. The sensor switches between a high and a low state of its output when a threshold crossing in the sensed magnetic field is detected. However, invalid switching events may occur from false crossings due to, for example, signal distortion or reduced amplitudes of single encoder marks. Furthermore, there is no failure fallback scheme is provided with respect to faults of the magnetic sensor elements (e.g., should one of the magnet sensor elements fail).

Therefore, an improved device that is capable of avoiding invalid switching events and that implements a failure fallback scheme may be desirable.

SUMMARY

Magnetic sensor modules, systems and methods are provided, configured to detect a rotation of an object, and, and more particularly, to detect a speed of rotation of an object.

Embodiments provide a magnetic sensor module configured to measure a magnetic field whose magnitude oscillates between a first extrema and a second extrema. The magnetic sensor module includes a magnetic sensor including a plurality of sensor elements configured to generate measurement values in response to sensing the magnetic field, where the plurality of sensor elements are grouped into a first shifted pair, a central pair, and a second shifted pair. The magnetic sensor module further includes a sensor circuit configured to receive the measurement values from the plurality of sensor elements, generate a first shifted differential measurement signal based on the measurement values received from the first shifted pair, a central differential measurement signal based on the measurement values received from the central pair, and a second shifted differential measurement signal based on the measurement values received from the second shifted pair, and generate an output signal based on detecting the first shifted differential measurement signal, the central differential measurement signal, and the second shifted differential measurement signal crossing at least one threshold.

Embodiments provide a method for sensing a rotation speed of an encoder. The method includes generating measurement values by a plurality of sensor elements in response to sensing a magnetic field, where the plurality of sensor elements are grouped into a first shifted pair, a central pair, and a second shifted pair; generating a first shifted differential measurement signal based on the measurement values generated by the first shifted pair, a central differential measurement signal based on the measurement values generated by the central pair, and a second shifted differential measurement signal based on the measurement values generated by the second shifted pair; and generating an output signal based on detecting the first shifted differential measurement signal, the central differential measurement signal, and the second shifted differential measurement signal crossing at least one threshold.

BRIEF DESCRIPTION OF THE DRAWINGS

Embodiments are described herein making reference to the appended drawings.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a current sensor, gauss meter, an angle sensor, a linear position sensor, a speed sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back bias magnet to form a sensor module, sensor device, or the like.

One or more magnetic field sensor elements, or for short a magnetic field sensors, included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from the magnetic field sensor element in the form of raw measurement data and derives, from the sensor signal, a measurement signal that represents the magnetic field. The sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, Hall plates, vertical Hall effect devices, or magneto-resistive sensors, often referred to as XMR sensors which is a collective term for anisotropic magneto-resistive (AMR), giant magneto-resistive (GMR), tunneling magneto-resistive (TMR), etc.

Magnetic field sensors provided herein may be configured for incremental speed and position measurement of a rotating magnetic encoder, such as a wheel or camshaft.

One type of magnetic encoder may be a ferromagnetic encoder, which may be a toothed wheel or a toothed disc of ferromagnetic material with holes or notches that pass in front of the magnetic field sensor. The magnetic field may be produced by a back bias magnet coupled to a back of the magnetic field sensor. Thus, the strength of the magnetic field produced by the back bias magnet is altered by the passing of teeth and notches of the rotating magnetic encoder.

A second type of magnetic encoder is an encoder that consists of alternating magnets, which are magnetized in a opposite directions (e.g., alternating south-pole and north-pole magnets). In this case the incremental speed sensor is placed in front of the encoder and detects if the measured magnetic field changes its polarity. In this case, the speed sensor generates an output signal that indicates that a pole passed by.

Figure 1A:
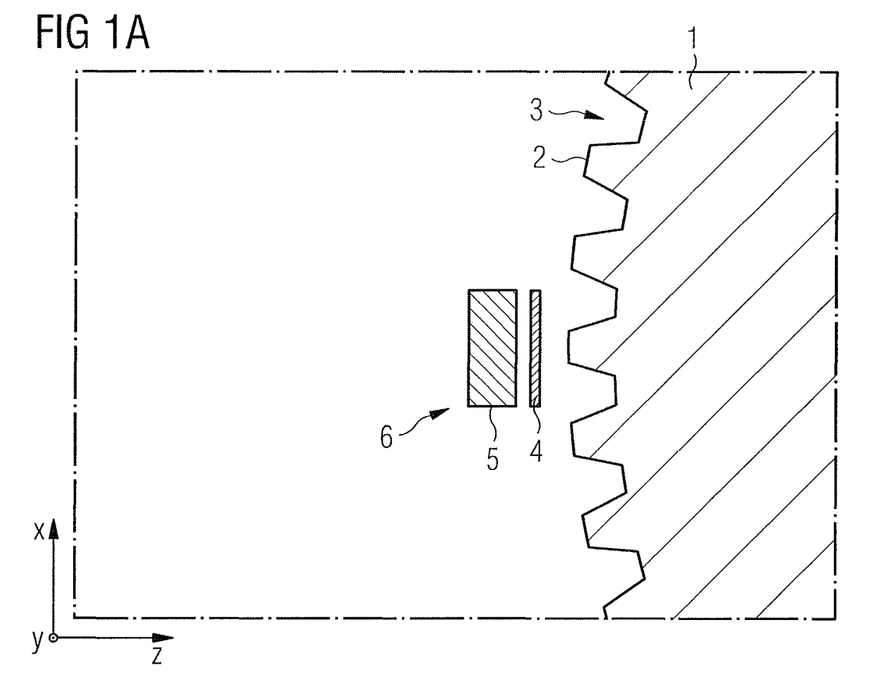
FIGS. 1A-1C illustrate a diagram of a magnetic field sensing principle using a first type of magnetic encoder according to one or more embodiments.
Figure 1B:
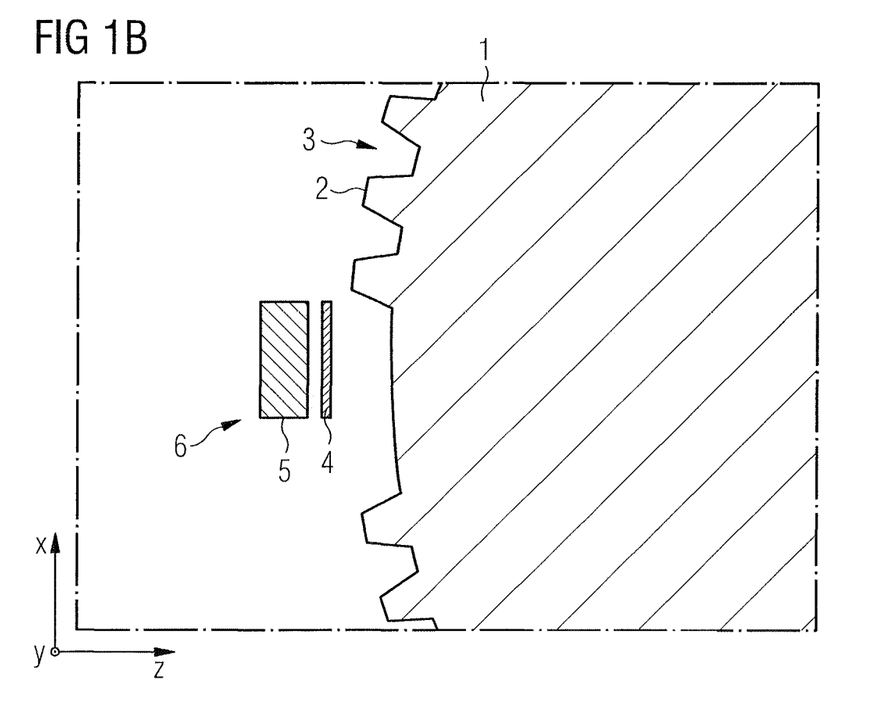
Figure 1C:
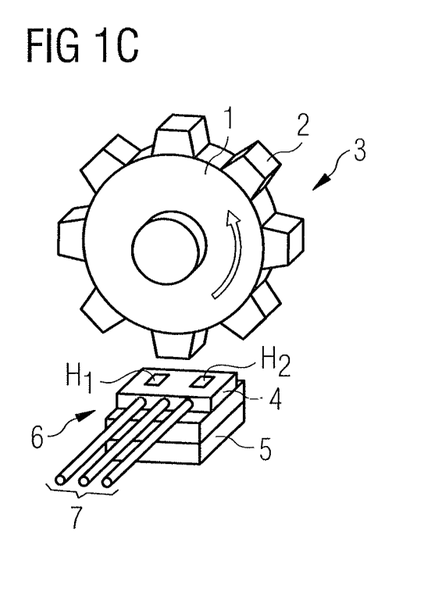

FIGS. 1A-1C illustrate a magnetic field sensing principle using a first type of magnetic encoder, a toothed wheel 1 that has alternating teeth 2 and notches 3, according to one or more embodiments. In particular, the toothed wheel 1 may be made of a ferromagnetic material (e.g., iron) that attracts magnetic fields. In addition, a sensor arrangement 4 is configured to sense a magnetic field produced by a back bias magnet 5, where the sensor arrangement 4 and the back bias magnet 5 comprise a sensor module 6. The sensor arrangement 4 may generally be referred to herein as sensor 4 may further include a sensor circuit (not shown) and may be disposed in a sensor package.

FIGS. 1A and 1B show a tooth 2 and a notch 3 of wheel 1 passing the sensor module 6, respectively. In the instance of FIG. 1A, the magnetic field lines of the bias magnetic field produced by the back bias magnet 5 are pulled in the z-direction towards the tooth 2. Thus, the magnetic field lines are pulled away from the x and y-axes (i.e., the sensor planes of the sensor arrangement 4) and the sensed magnetic field strength in the x and y-directions is reduced such that a minimum field strength is detected at the center of the tooth 2. This may differ in real-world applications where the minimum may not occur exactly at the center due to assembly tolerances, but the minimum field strength should be detected substantially at the center of the tooth 2.

Conversely, in the instance of FIG. 1B, the magnetic field lines of the bias magnetic field produced by the back bias magnet 5 are not pulled (or are less pulled) in the z-direction towards the notch 3. Thus, the magnetic field lines remain concentrated relative to the x and y-axes (i.e., the sensor planes of the sensor arrangement 4) and the sensed magnetic field strength in the x and y-directions are at a maximum at the center of the notch 3. This may differ in real-world applications where the maximum may not occur exactly at the center, but the maximum field strength should be detected substantially at the center of the notch 3.

FIG. 1C illustrates a schematic view of the sensor module 6 in proximity to the toothed wheel 1. The sensor module 6 includes sensor arrangement 4 having a sensor circuit (not shown) and two magnetic field sensor elements, Hall plate H1 and Hall plate H2, and a back bias magnet 5 coupled to the sensor arrangement 4. The two magnetic field sensor elements H1 and H2 may be referred to herein as differential sensor elements and are linearly aligned in a rotation direction of the toothed wheel 1. The sensor signals of each differential sensor element H1 and H2 is provided to the sensor circuit that calculates a differential measurement signal using a differential calculation that may be used to cancel out homogeneous stray-fields in the sensor plane directions. In addition, the differential sensor elements H1 and H2 may be disposed at a distance of about half of the pitch of the teeth of the toothed wheel 1 in order to generate a differential measurement signal with high signal to noise ratio. A pitch is the distance along a pitch circle between two adjacent teeth of a toothed wheel. Lastly, leads 7 provide an electrical pathway for various input and output signals (e.g., power, command and output signals) to and from the sensor arrangement 4.

As the wheel 1 rotates, the teeth 2 and notches 3 alternate past the sensor module 6 and the sensor elements within the sensor arrangement 4 sense a change in the x-axis and y-axis magnetic field strength that varies as a sinusoidal waveform (i.e., as a signal modulation), the frequency of which corresponds to a speed of rotation of the wheel, and which further corresponds to a speed of rotation of a drive shaft (e.g., camshaft) that drives the rotation of the wheel. Thus, the sensor circuit of the sensor arrangement 4 receives signals (i.e., sensor signals) from the magnetic field sensor elements H1 and H2 and derives, from the sensor signals, a differential measurement signal that represents the magnetic field as a signal modulation. The differential measurement signal may then be output as an output signal to an external controller, control unit or processor (e.g., an ECU), or used internally by the sensor circuit for further processing (e.g., to generate a pulsed output signal) before being output to an external device. For example, the external device may count the pulses of the pulsed output signal and calculate a wheel-speed therefrom.

In addition, a third magnetic field sensor element (not shown) may be disposed on the sensor arrangement 4 in the middle between the two differential sensor elements H1 and 112 to enable the sensor to detection a rotational direction of the wheel 1.

Figure 1D:
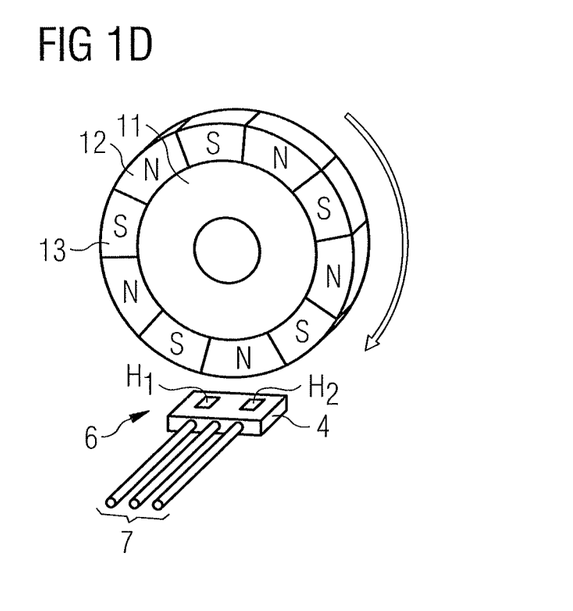
FIG. 1D illustrates a diagram of a magnetic field sensing principle using a second type of magnetic encoder according to one or more embodiments.

FIG. 1D illustrates a magnetic field sensing principle using a second type of magnetic encoder, a magnetized encoder wheel, according to one or more embodiments. The sensor module 6 includes sensor arrangement 4 having a sensor circuit (not shown) and two differential magnetic field sensor elements, Hall plate H1 and Hall plate H2. The sensor signals of each differential sensor element H1 and H2 is provided to the sensor circuit that calculates a differential measurement signal using a differential calculation that may be used to cancel out homogeneous stray-fields in the sensor plane directions. In addition, the differential sensor elements H1 and H2 may be disposed at a distance of about half of the pitch of the poles of the magnetized encoder wheel 11 in order to generate a differential measurement signal with high signal to noise ratio. A pitch is the distance along a pitch circle between two poles of the same polarity (i.e., between two adjacent positive poles or two adjacent negative poles) for a magnetized encoder wheel.

A magnetized encoder wheel 11 comprises alternating north pole sections 12 and south pole sections 13. Accordingly, the north pole sections 12 and south pole sections 13 represent teeth and notches of a tooth and notch wheel 1 described above. The sensor elements H1 and H2 of sensor arrangement 4, as described in reference to FIG. 1C, are sensitive to magnetic fields influenced by the north pole sections 12 and south pole sections 13 of the wheel 11. Here, since the magnetic field is actively generated by the wheel 11, a back bias magnet can be omitted. A sensor output corresponds to the rotational speed of the magnetized encoder wheel 11 by detecting the change of the alternating magnetic field in a similar manner described with respect to FIG. 1C. Thus, the sensor circuit of the sensor arrangement 4 generates a sensor output to be output by one of the leads 7.

Figure 2:
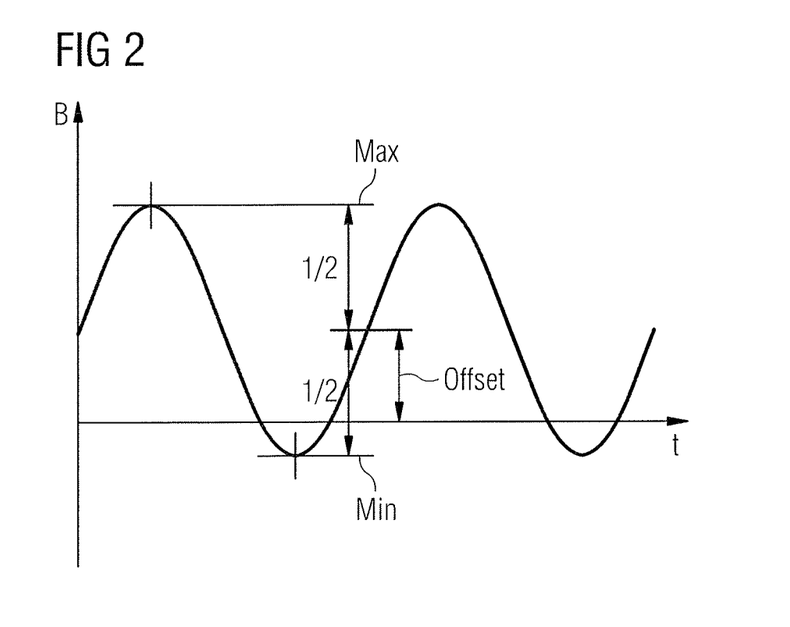
FIG. 2 illustrates a diagram of a measurement signal generated by a sensor circuit according to one or more embodiments.

FIG. 2 illustrates an example of a measurement signal generated by a sensor circuit according to one or more embodiments. The measurement signal may be a differential measurement signal, derived from two sensor signals using differential calculus as described above with respect to FIGS. 1C and 1D. The measurement signal is a measurement of the magnetic field B sensed over time t by the magnetic sensor, and oscillates between two extrema (e.g., minimum and maximum) as the magnetic encoder rotates. Furthermore, the measurement signal may have an offset from an x-axis in a y-axis direction, and may further be normalized by processing performed by the sensor circuit.

The pulses of an output signal may be generated by a sensor circuit of the magnetic sensor (i.e., sensor arrangement 4) upon the detection of a crossing of a switching point (i.e., a switching threshold) of the measurement signal of the magnetic field (i.e., the magnetic field signal). The switching point, stored in memory, is located between the minimum (min) and the maximum (max) of the magnetic field B. Furthermore, the sensor circuit may regularly and autonomously (re)calculate the switching point and self-calibrate the switching point based on an average of one or more minima and one or more maxima of the measured magnetic field. For example, the switching point may be calculated as an average of the most recent minimum and maximum values of the measurement signal, and adjusted accordingly. The switching point may be adjusted if the new switching point value deviated by more than a predetermined threshold (e.g., 5%) of the current switching point value, for example, but is not limited thereto. By adapting the switching point on a continual basis, the accuracy of the switching point is maintained in a desired region in accordance with fast changes of the measurement signal and assures that a good jitter performance is achieved.

As noted above, the measurement of the magnetic field may be done differentially between two magnetic field sensor elements (e.g., Hall or XMR sensors) placed in a distance of about half of the pitch of the poles or teeth of an encoder wheel in order to generate a measurement signal with high signal to noise ratio. The sensor 4 switches between a high state and a low state of its output when a threshold crossing is detected. Alternatively, the sensor 4 may deliver a pulse of known length if the threshold crossing is detected. In some systems, the pulse length may be varied via pulse width modulation, for example, in order to deliver additional information such as an indication of sufficient magnetic field strength, rotation direction or error flags. In other systems, this kind of information may be transmitted by a short Manchester protocol following each output pulse.

Figure 3A:
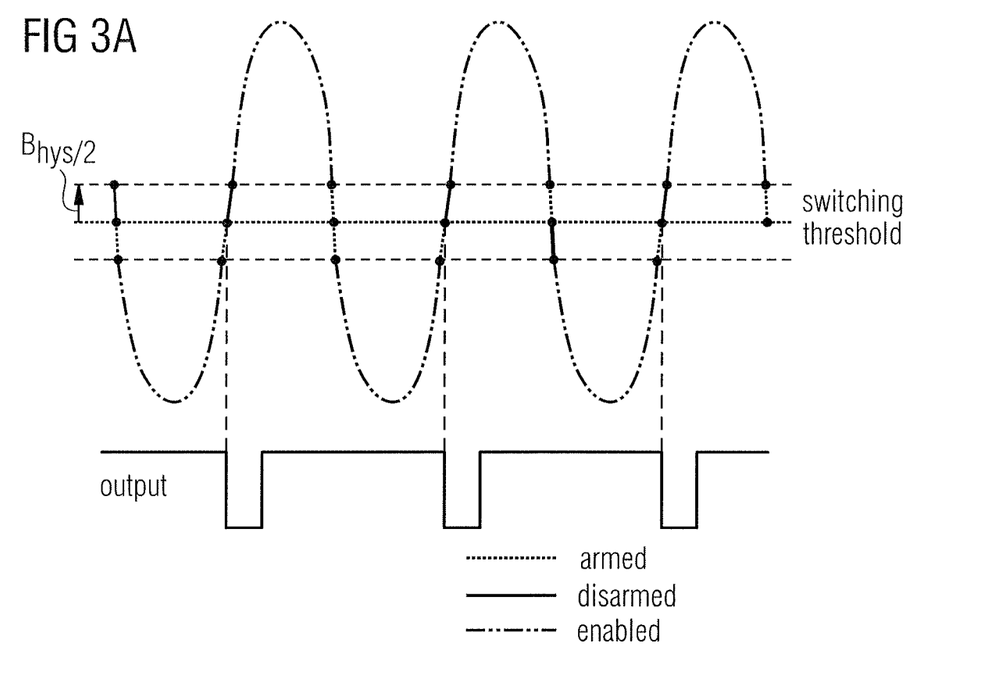
FIG. 3A illustrates a diagram of a pulsed output signal generated by a magnetic speed sensor according to one or more embodiments.

FIG. 3A illustrates an example of a pulsed output signal generated by a magnetic speed sensor according to one or more embodiments. In particular, the upper waveform represents a differential measurement signal that is compared to three comparator thresholds used to generate the pulsed output signal. The three comparator thresholds include a switching threshold and two hysteresis thresholds. The switching threshold is a switching point at which the sensor 4 switches between the high and the low state (or vice versa) of its output when the crossing of the switching point is detected. In order to avoid multiple switching of the output signal while the measurement signal is close to the switching threshold, a hidden hysteresis is introduced such that two additional thresholds are provided on opposite sides of the switching threshold. The hysteresis thresholds may be set equidistant from the switching threshold such that the hysteresis region measures $B_{hys}$ and each hysteresis threshold is $B_{hys}/2$ from the switching threshold. However, the embodiments provided herein are not limited thereto and may not be set equidistant from the switching threshold. The region between the two hysteresis thresholds may be referred to as a hysteresis band or hysteresis region.

Using a hidden hysteresis mechanism, the switching mechanism may set to an "armed state" when the measurement signal is detected crossing a first hysteresis level coming from outside the hysteresis band, but the output switching is not done immediately. Once the switching threshold is reached in the armed state, the output is switched and the switching mechanism is set to a "disarmed state" to avoid noise induced multiple switching. In order to allow the next arming, the measurement signal has to leave the hysteresis band so that the switching mechanism is set to a "re-enabled state" or "ready state." A "re-enabled" or "ready" state is a state in which the switching mechanism is capable of being armed.

In FIG. 3A, the output signal is pulsed when the measurement signal crosses switching threshold as the measurement signal moves into the hysteresis band after crossing the lower hysteresis threshold (e.g., on a rising edge). However, the sensor circuit may be configured such that the output signal is pulsed when the measurement signal crosses the switching threshold from either direction (e.g., one a rising or falling edge) or only when the measurement signal moves into the hysteresis band after crossing the upper hysteresis threshold (e.g., on a falling edge). Alternatively, the output may be switched from logic low to high on a first rising edge of the measurement signal and from logic high to low on a first falling edge of the measurement signal, or vice versa, where the rising and the falling edges occur at a switching threshold crossing.

Figure 3B:
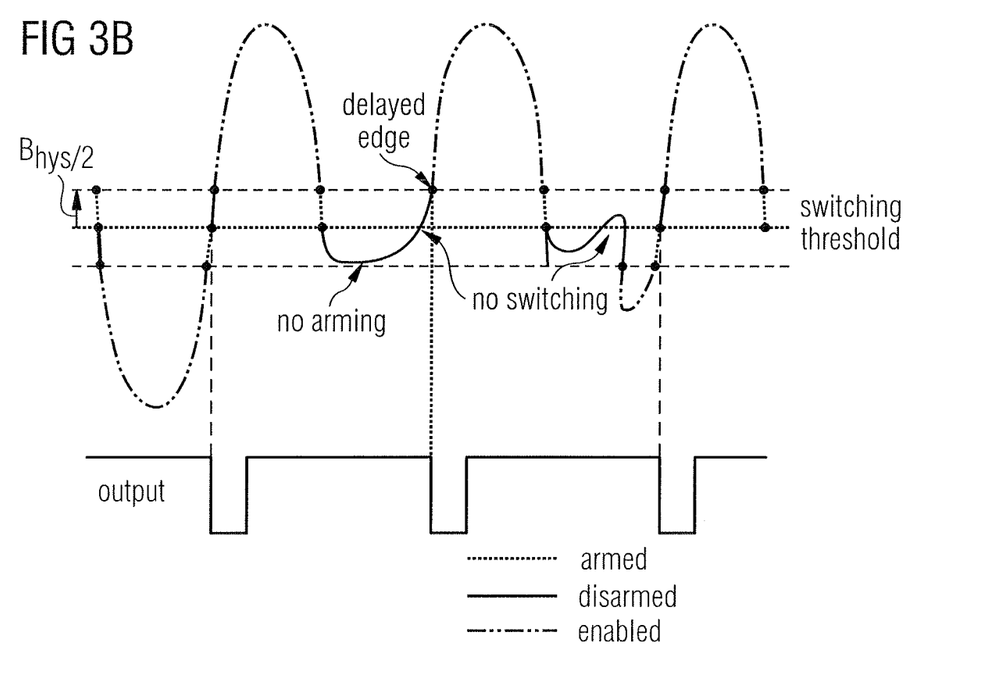
FIG. 3B illustrates another a diagram of a pulsed output signal generated by a magnetic speed sensor according to one or more embodiments.

FIG. 3B illustrates another example of a pulsed output signal generated by a magnetic speed sensor according to one or more embodiments. In this example, the measurement signal may not exit the hysteresis band after crossing the switching threshold. Thus, to avoid the loss of switching events due to, for example, signal distortion or reduced amplitudes of single encoder marks, the following exception is defined: for a case in which the measurement signal crosses a first hysteresis threshold but does not cross a second hysteresis threshold after crossing the switching threshold, the crossing of the first hysteresis level (again) leads to a switching event and enables re-arming of the switching mechanism. That is, the switching mechanism is set to a "ready state" after the measurement signal crosses the first hysteresis threshold after switching (i.e., after crossing the switching threshold). It will be appreciated that the upper hysteresis threshold is used merely as an example, and that the first hysteresis threshold may be either the upper hysteresis threshold or the lower hysteresis threshold whenever applicable.

It may be desirable to be able to detect a fault in the event that one or more of the sensor elements fails, and adapt the sensor system to make use of still-operational sensor elements to continue sensing operations. Thus, the use of decentered (phase shifted) differential sensor pairs is provided to implement hidden hysteresis in a way that the sensor may be more fault tolerant. Furthermore, the sensor system may be adapted to make use of new information delivered by the sensor in case of a detected fault.

Thus, a magnetic sensor is provided using at least three sensor elements and a sensor circuit configured to generate at least three different differential measurement signals using different sensor element pairs that are shifted from each other with respect to their geometrical center of gravity.

FIGS. 4A-D illustrate different sensor element configurations implemented by one or more embodiments. In particular, the sensor elements are arranged on sensors 4a-d having a chip width adapted to accommodate the placement of the sensor elements. Each sensor 4a-d has two centered sensor elements making up a centered sensor pair and at least one shifted sensor element. Furthermore, each sensor 4a-d has a geometric center 41a-d located substantially half-way between the two centered sensor elements.

The sensor circuit of each sensor 4a-d is configured to generate at least three differential measurement signals using at least three different sensor pairs, where at least two sensor pairs are shifted with respect to the geometrical center 41a-d. The distance between the two centered sensor elements is matched or substantially matched (e.g., within 5% to allow for manufacturing tolerances) to a pitch of the poles or the teeth of the encoder, however, the distance may be reduced in order to save chip area. The sensor elements are linearly aligned in a rotation direction of the encoder wheel. The result is three differential measurement signals (e.g., a left-shifted measurement signal, a centered measurement signal, and a right-shifted measurement signal) which follow an encoder pattern that are phase shifted against each other. The encoder pattern (e.g., pattern of teeth and notches or north and south poles) is represented by the oscillating pattern of the magnetic field as the encoder rotates. A phase shift of the three differential measurement signals may be chosen in a way that the difference between the decentered (shifted) signal amplitudes and the centered signal is sufficiently larger (e.g., 3 . . . 6 sigma) than the noise on one of the differential measurement signals.

Figure 4A:
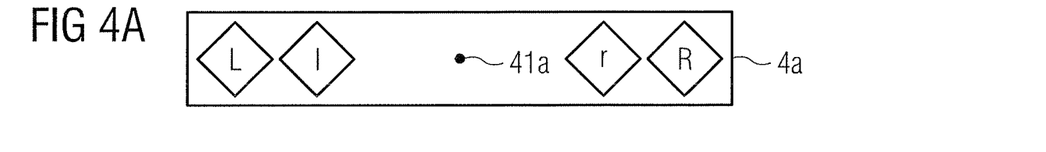
FIGS. 4A-D illustrate a block diagram of different sensor element configurations implemented by one or more embodiments.

FIG. 4A illustrates a first sensor element configuration that includes sensor elements L, l, r and R that are grouped to form three different sensor element pairs and from which three different differential measurement signals are derived. In particular, sensor elements L and r form a left-shifted sensor pair (L-r), sensor elements L and R form a centered sensor pair (L-R) with a distance therebetween matched or substantially matched to the pitch of the poles or the teeth of the encoder, and sensor elements l and R are used to form a right-shifted sensor pair (l-R).

Figure 4B:
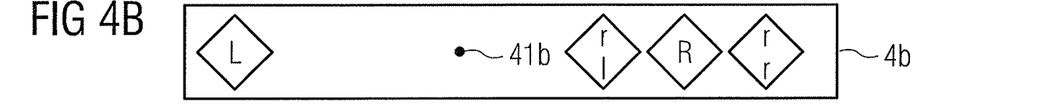

FIG. 4B illustrates a second sensor element configuration that includes sensor elements L, rl, R and rr that are grouped to form three different sensor element pairs and from which three different differential measurement signals are derived. In particular, sensor elements L and rl form a left-shifted sensor pair (L-rl), sensor elements L and R form a centered sensor pair (L-R) with a distance therebetween matched or substantially matched to the pitch of the poles or the teeth of the encoder, and sensor elements L and rr are used to form a right-shifted sensor pair (L-rr).

Figure 4C:
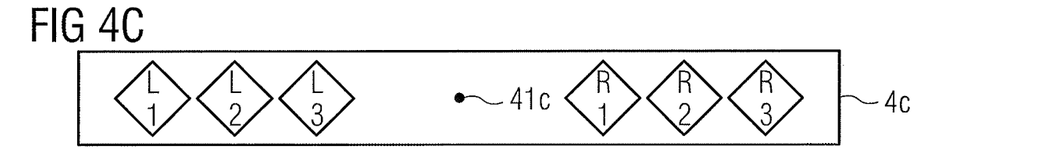

FIG. 4C illustrates a third sensor element configuration that includes sensor elements L1, L2, L3, R1, R2 and R3 that are grouped to form three different sensor element pairs and from which three different differential measurement signals are derived. In particular, sensor elements L1 and R1 form a left-shifted sensor pair (L1-R1), sensor elements L2 and R2 form a centered sensor pair (L2-R2) with a distance therebetween matched or substantially matched to the pitch of the poles or the teeth of the encoder, and sensor elements L3 and R3 are used to form a right-shifted sensor pair (L3-R3).

Figure 4D:
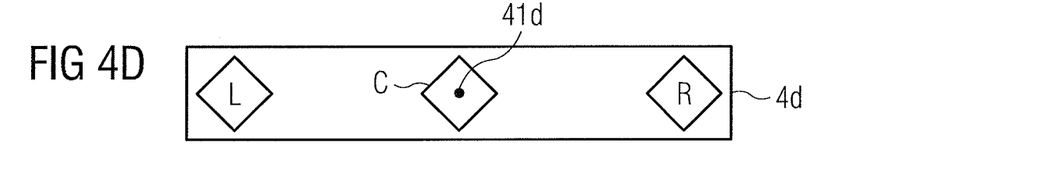

FIG. 4D illustrates a fourth sensor element configuration that includes sensor elements L, C and R that are grouped to form three different sensor element pairs and from which three different differential measurement signals are derived. In particular, sensor elements L and C form a left-shifted sensor pair (L-C), sensor elements L and R form a centered sensor pair (L-R) with a distance there between matched or substantially matched to the pitch of the poles or the teeth of the encoder, and sensor elements C and R are used to form a right-shifted sensor pair (C-R). Thus, the distance between the left-shifted sensor pair (L-C) may be matched or substantially matched to half the pitch of the poles or the teeth of the encoder. Likewise, the distance between the right-shifted sensor pair (C-R) may be matched or substantially matched to half the pitch of the poles or the teeth of the encoder.

Table 1 below summarizes the configurations of the sensor elements in each of FIGS. 4A-D and some possible advantages and disadvantages of each configuration.

TABLE 1

| Reference to FIG. | Left shifted Pair | Centered Pair | Right shifted Pair | Implementation |
|---|---|---|---|---|
| FIG. 4A | L-r | L-R | l-R | Chip dimension not increased. |
| FIG. 4B | L-rl | L-R | L-rr | More than one right-side element can fail. |
| FIG. 4C | L1-R1 | L2-R2 | L3-R3 | All 3 pairs may have matched pitch. Reconfigurations with 3 differential signals still possible (e.g., config 1) if one sensor fails. |
| FIG. 4D | L-C | L-R | C-R | Chip dimension not increased. |

Figure 5:
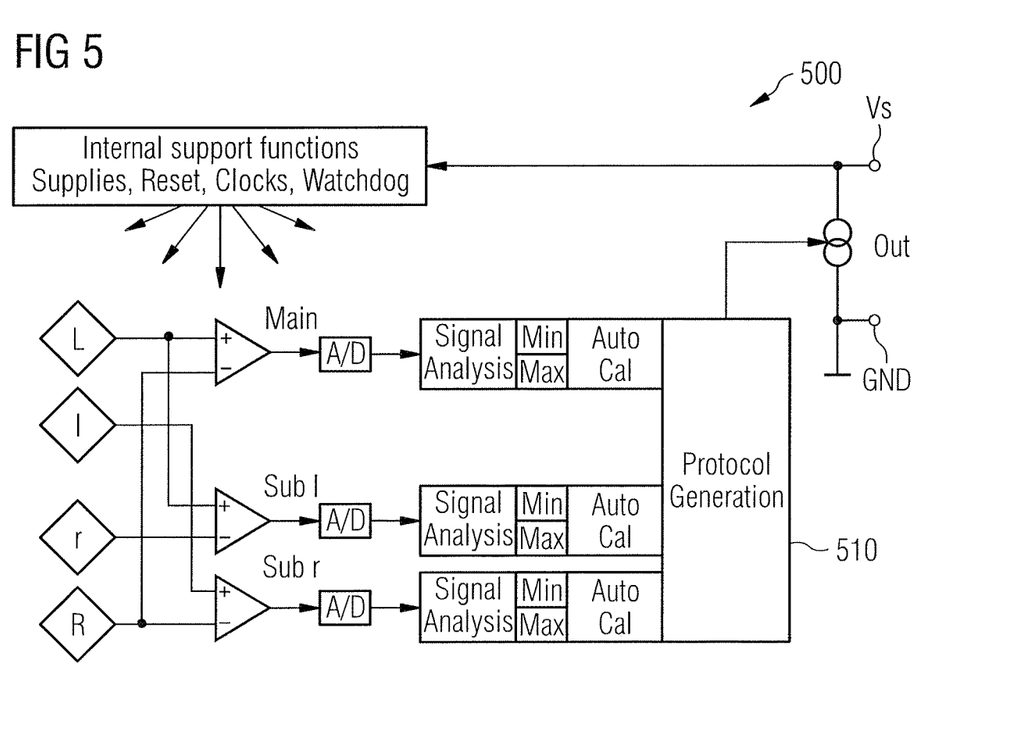
FIG. 5 illustrates a block diagram of a sensor circuit according to a first sensor element configuration shown in FIG. 4A according to one or more embodiments.

FIG. 5 illustrates an example of a sensor circuit 500 configured to generate three differential measurement signals according to the first sensor element configuration shown in FIG. 4A. It will be appreciated that the sensor circuit 500 may be integrated on a single chip and can be adapted according to the different configurations described in FIGS. 4B-D. Thus, the sensor circuit receives input signals from the sensor elements (e.g., L, l, r and R) and provides and output signal (Out) via modulating a current (e.g., a current consumption) between to supply pins, supply (Vs) and ground (GND).

The sensor circuit 500 includes a main branch connected to and configured to receive signals from sensor elements L and R (i.e., centered sensor pair (L-R)). The main branch is configured to generate a centered measurement signal and perform a signal analysis thereon by comparing the centered measurement signal to the three threshold values discussed above (i.e., the lower hysteresis threshold value, the switching threshold value and the upper hysteresis threshold value). The main branch may also be configured to perform an auto calibration on one or more of three thresholds based on monitoring maximum and minimum values of the centered measurement signal.

Alternatively, the one or more of three thresholds may remain unchanged. Instead, the calibration unit of the main branch may be configured to monitor the first extrema and the second extrema, and adjust an offset compensation signal or value applied to the center measurement signal based on an average of the first extrema and the second extrema. Thus, the center measurement signal may be adjusted prior to comparing it to the one or more thresholds.

The sensor circuit 500 further includes a secondary left branch (sub l) connected to and configured to receive signals from sensor elements L and r (i.e., left-shifted sensor pair (L-r)). The secondary left branch is configured to generate a left-shifted measurement signal and perform a signal analysis thereon by comparing the left-shifted measurement signal to the three threshold values discussed above (i.e., the lower hysteresis threshold value, the switching threshold value and the upper hysteresis threshold value). The secondary left branch may also be configured to perform an auto calibration on one or more of three thresholds based on monitoring maximum and minimum values of the centered measurement signal.

Alternatively, the one or more of three thresholds may remain unchanged. Instead, the calibration unit of the secondary left branch may be configured to monitor the first extrema and the second extrema, and adjust an offset compensation signal or value applied to the left-shifted measurement signal based on an average of the first extrema and the second extrema. Thus, the left-shifted measurement signal may be adjusted prior to comparing it to the one or more thresholds.

The sensor circuit 500 further includes a secondary right branch (sub r) connected to and configured to receive signals from sensor elements 1 and R (i.e., right-shifted sensor pair (L-r)). The secondary left branch is configured to generate a left-shifted measurement signal and perform a signal analysis thereon by comparing the left-shifted measurement signal to the three threshold values discussed above (i.e., the lower hysteresis threshold value, the switching threshold value and the upper hysteresis threshold value). The secondary left branch may also be configured to perform an auto calibration on one or more of three thresholds based on monitoring maximum and minimum values of the centered measurement signal.

Alternatively, the one or more of three thresholds may remain unchanged. Instead, the calibration unit of the secondary right branch may be configured to monitor the first extrema and the second extrema, and adjust an offset compensation signal or value applied to the right-shifted measurement signal based on an average of the first extrema and the second extrema. Thus, the right-shifted measurement signal may be adjusted prior to comparing it to the one or more thresholds.

The sensor circuit 500 further includes a protocol generation unit 510 that is programmed with switching rule sets, stored in memory, and is configured to generate the output signal (Out) based on the signal analysis provided by each circuit branch and the switching rule sets. The protocol generation unit 510 may be referred to herein as a controller, processor or output unit that is configured to generate an output signal at the output (Out) of the sensor by signal modulation.

In addition, protocol generation unit 510 may be referred to as or include a finite-state machine (FSM) that may change from one state to another state in response to some external inputs. Thus, the FSM may decide how the state changes depending on incoming measurement signals and an actual state. Furthermore, the FSM may initiate, control and/or perform a predetermined sequence of actions depending on a sequence of events with which it is presented based on the sequence of threshold crossings made by the left-shifted differential measurement signal, the central differential measurement signal, and the right-shifted differential measurement signal. The FSM may include regular states that change depending on the inputs and it may also include exception rules that can also change the regular state (but may be delayed) and it may also have additional exception states which are only reached or left by the exception rules.

The switching rule sets are described in the following examples in conjunction with FIGS. 6A-B and FIGS. 7A-B.

Figure 6A:
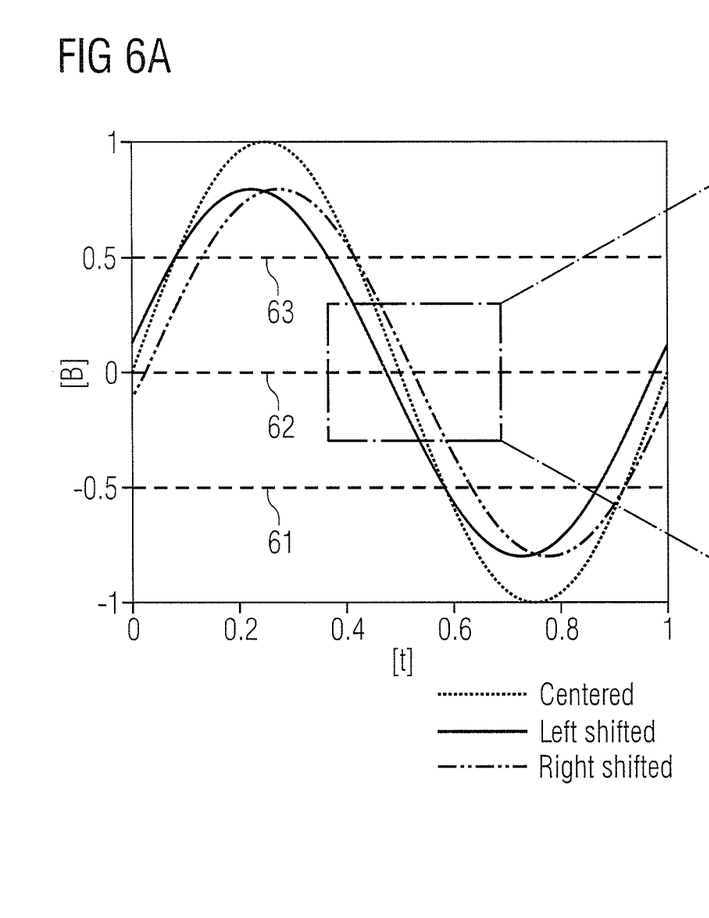
FIG. 6A illustrates a diagram of three differential measurement signals generated by a magnetic speed sensor according to one or more embodiments.

FIG. 6A illustrates an example of three differential measurement signals generated by a magnetic speed sensor according to one or more embodiments. In particular, the measurement signals include a left-shifted measurement signal, a centered measurement signal, and a right-shifted measurement signal shown over one magnetic field period (t). The measurement signals are normalized with respect to one another according to the y-axis representing the magnetic field B. The graph illustrated in FIG. 6A further includes a lower hysteresis threshold 62, a switching threshold 62, and an upper hysteresis threshold 63. As noted above, a phase shift of the three differential measurement signals may be chosen in a way that the difference between the decentered (shifted) signal amplitudes and the centered signal is sufficiently larger (e.g., 3 . . . 6 sigma) than the noise on one of the differential measurement signals.

The amplitude of the centered measurement signal is greater than the left-shifted and right-shifted measurement signals due to the distance between the L and R sensor elements (i.e., the centered sensor pair) being matched or substantially matched to the pitch of the encoder, whereas the distance between the other sensor pairs are not matched to the pitch. However, it will be appreciated that one or more of the other sensor pairs may also be matched to the pitch in certain embodiments.

It can also be observed at the switching threshold crossing that the left-shifted measurement signal is phase shifted to the left of the center measurement signal, and the right-shifted measurement signal is phase shifted to the right of the center measurement signal. This is due to the placement of the respective left and right-shifted sensor pairs relative to the rotation of the encoder wheel.

Figure 6B:
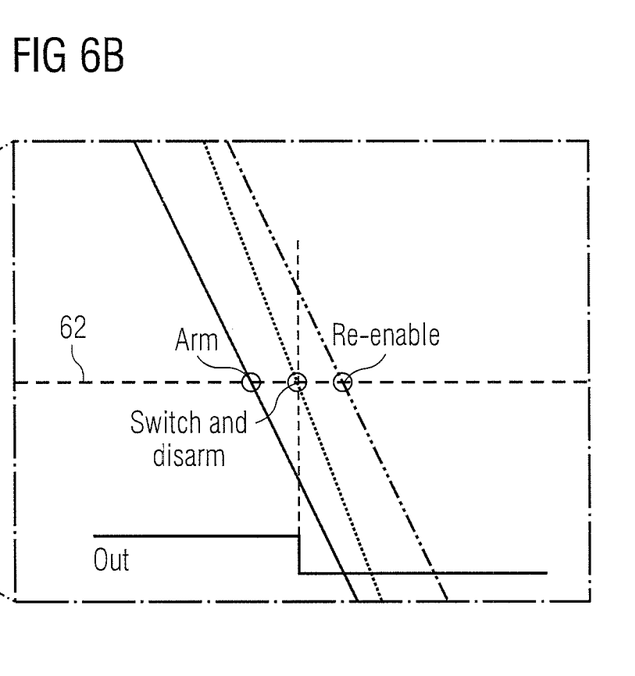
FIG. 6B illustrates a diagram of an enlarged view of a portion of FIG. 6A.

FIG. 6B illustrates an enlarged view of the measurement signals crossing the switching threshold 62, and an output signal (Out).

One or more switching rules may be implemented by the protocol generation unit 510, alone or in combination to for a rule set, to generate the output signal. The switching rule sets include rules for changing the switching mechanism between and "armed state", "disarmed state" and a "ready state", and for triggering a switch in the output state of the output signal. The "ready state" is a state at which the switching mechanism is no longer disarmed and is capable of being armed. However, it will be appreciated that the switching mechanism may be transition directly from a "disarmed state" to an "armed state" without transitioning to a "ready state" in one or more embodiments based on meeting one or more rules in a rule set. It will also be appreciated that the switching mechanism may be pulse mechanism such that a signal pulse is generated at a trigger event that causes the output of the sensor to be modulated, as opposed to a single logic state transition.

According to FIGS. 6A and 6B, the switching mechanism is armed when the left-shifted measurement signal crosses the switching threshold 62 on a falling edge, a switch or a pulse is triggered in the output signal and the switching mechanism is disarmed when the center measurement signal crosses the switching threshold 62 on a falling edge, and the switching mechanism is re-enabled to the ready state when the right-shifted measurement signal crosses the he switching threshold 62 on a falling edge. Thus, the output (Out) is switched, in this example, from high to low when the center measurement signal crosses the switching threshold 62 on a falling edge, as shown in FIG. 6B, after the switching mechanism has been armed.

It will be appreciated the sensor circuit can be configured such that the states of the switching mechanism and the output change based on a rising edge of the three measurement signals or based on both rising edges and falling edges of the three measurement signals. For example, the output may be switched from logic low to high on a first rising edge of the center measurement signal and from logic high to low on a first falling edge of the center measurement signal, or vice versa, where the rising and falling edges occur at a crossing of the switching threshold 62.

It will be further appreciated that the ordering of the signals and their respective assigned triggers of arming, disarming and re-enabling may be reversed for an opposite rotation direction of the encoder (e.g., clockwise vs. counter-clockwise rotation of the encoder wheel). That is, when the rotation direction is reversed, the right-shifted measurement signal may be the first, earlier signal that triggers an arming, and the left-shifted measurement signal may be the third, later signal that triggers re-enabling of the ready state. The rotation direction may also be referred to as an oscillation direction of the magnetic field.

Furthermore, one or more of the following switching rules may be implemented by the protocol generation unit 510, alone or in combination to form a switching rule set, for generating the modulated output signal. One or more rules of the following may be implemented in conjunction with the rule set described in FIGS. 6A and 6B, or may form a new embodiment.

A first switching rule includes: arm the switching mechanism when any two of the three measurement signals have a threshold crossing at the same hysteresis threshold (e.g., upper hysteresis threshold 63 for a falling edge or lower hysteresis threshold 61 for a rising edge).

A second switching rule includes: switch the output (e.g., from logic high to low or low to high) or pulse the output and disarm the switching mechanism when any two of the three measurement signals have a threshold crossing at the switching threshold 62.

A third switching rule includes: re-enable the switching mechanism to a ready state when all three measurement signals have a threshold crossing at the switching threshold 62, for example, in the same direction (e.g., falling edge or rising edge).

A fourth switching rule includes: re-enable the switching mechanism to a ready state when any two of the three measurement signals have a threshold crossing at a same hysteresis threshold (e.g., lower hysteresis threshold 61 for a falling edge or upper hysteresis threshold 63 for a rising edge).

A fifth switching rule includes: re-enable the switching mechanism to a ready state when one of the signals captures a new extremum after a last switching event.

A sixth switching rule includes: arm the switching mechanism when one of the shifted (left or right) measurement signals has a threshold crossing at the switching threshold 62.

A seventh switching rule includes: arm the switching mechanism when the centered measurement signal has a threshold crossing at the switching threshold 62.

An eighth switching rule includes: switch or pulse the output when the center measurement signal has a threshold crossing at the switching threshold 62 when the switching mechanism is in an armed state.

A ninth switching rule includes: switch or pulse the output when the two shifted measurement signals (respectively right or left-shifted) have a threshold crossing at the switching threshold 62 in the same direction (e.g., falling edge or rising edge) in the absence of the center measurement signal having a threshold crossing, at the switching threshold 62 in the same direction, between crossings of the two shifted measurement signals. That is, the first shifted measurement signal (e.g., left-shifted in FIGS. 6A and 6B) may arm the switching mechanism, and the second shifted measurement signal (e.g., right-shifted in FIGS. 6A and 6B) may switch the output and disarm the switching mechanism in the event the center measurement signal has not yet crossed the switching threshold 62 since the switching mechanism has been armed.

A tenth switching rule includes: re-enable the switching mechanism to the ready state with a threshold crossing at the switching threshold 62 by a third measurement signal in a same direction (e.g., falling edge or rising edge) as the previous two measurement signals. For example, in the case of the ninth switching rule, the third signal that has yet to cross the switching threshold 62 in the same direction would be the center measurement signal. Thus, the crossing of the center measurement signal would re-enable the switching mechanism in that scenario.

An eleventh switching rule includes: re-enable if two of the three measurement signals captured a new extremum after a last switching event.

It will be appreciated that other rules may be programmed and implemented by the protocol generation unit 510, and that the above rules are not intended to be limiting.

Figure 7A:
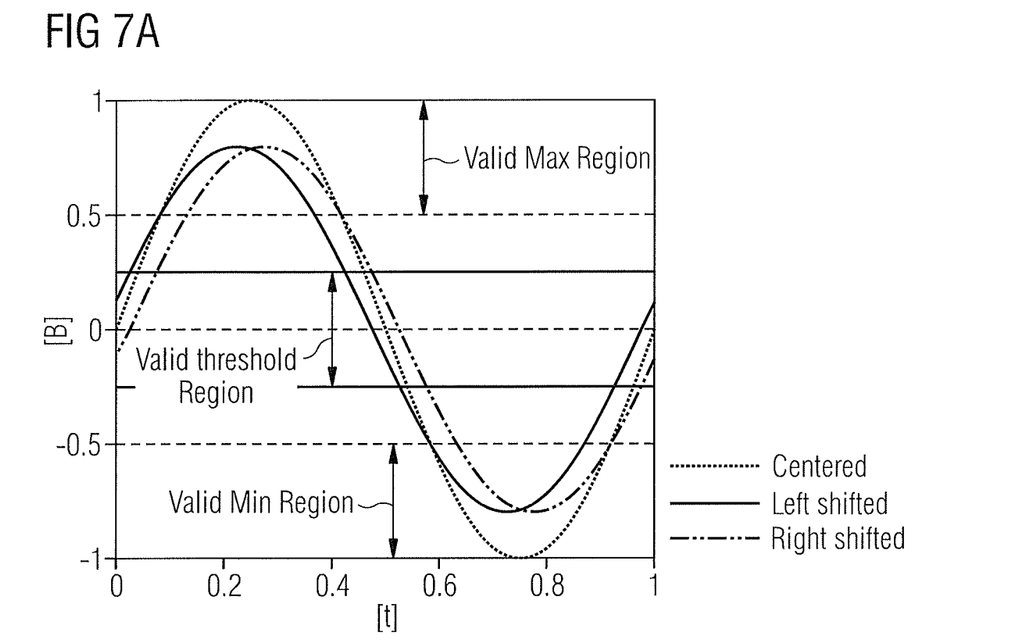
FIGS. 7A and 7B illustrate another a diagram of three differential measurement signals generated by a magnetic speed sensor according to one or more embodiments.
Figure 7B:
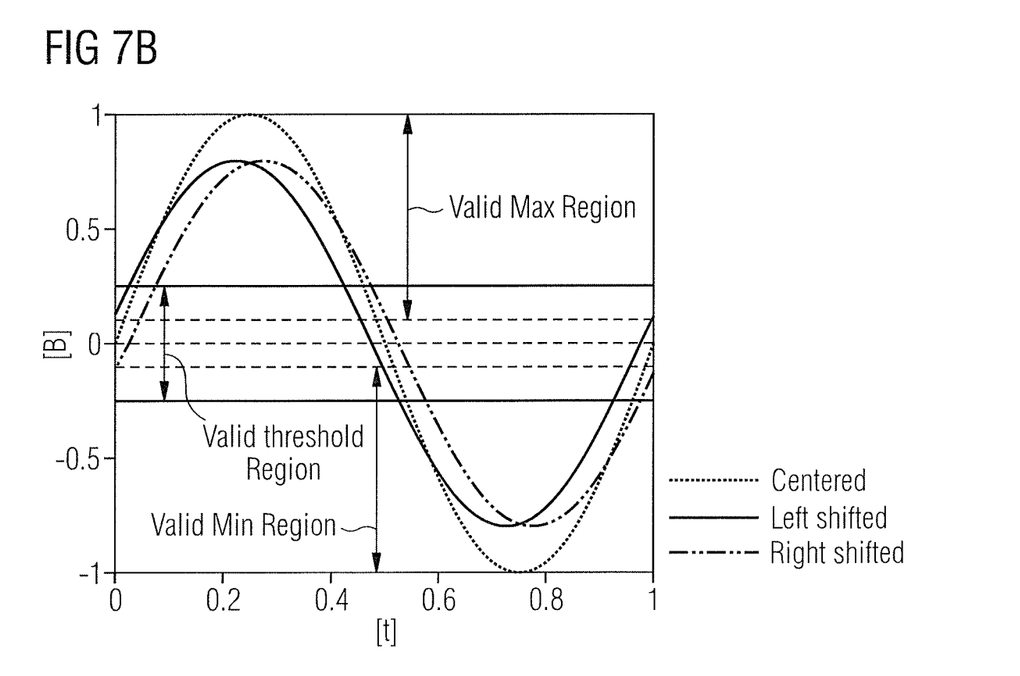

FIGS. 7A and 7B illustrate another example of three differential measurement signals generated by a magnetic speed sensor according to one or more embodiments. In particular, three validity ranges (e.g., valid max, valid threshold and valid min) may be provided, and the switching rules above may be adapted to the validity ranges. The validity ranges may not overlap, as in FIG. 7A, or may overlap, as in FIG. 7B.

In one example, after a switching output occurs based on a falling edge crossing of the center measuring signal, the switching mechanism may be re-enabled to the ready state upon the center measurement signal entering the valid min or valid max region.

Furthermore, the measurement signals may be accepted as valid when all three validity ranges are passed. For example, if a measurement signal does not pass through all three validity ranges over a specified magnetic field period or a specified duration of time, the measurement signal may be determined by the sensor circuit to be invalid. In other words, if a signal no longer reaches a valid maximum threshold, valid minimum threshold, or both, the signal may be identified as invalid. This implementation may be used separate from or in combination from any other embodiment described herein in order to identify an invalid measurement signal.

In addition, each measurement signal may be determined as valid based on the relation of the amplitudes versus each other. For example, one that may be significantly below the others (e.g., less than 75%) may be regarded as faulty. In addition or alternatively, each of the measurement signals may be determined as valid based on a relation of the offsets applied thereto, such that a measurement signal with an offset that exceeds a threshold offset may be regarded to as faulty. These implementations may be used separate from or in combination from any other embodiment described herein in order to identify an invalid measurement signal.

If a measurement signal is identified as invalid the sensor may also modify a current rule set in order to maintain the correct switching point depending on the measurement signals that are still available. Thus, a fallback scheme using modified fallback rules may be implemented in the event one or more of the measurement signals becomes invalid due to, for example, a failed sensor element that corresponds to the invalid measurement signal.

In addition, one or more sensor pair groupings may be adjusted by the sensor circuit based on detected a faulty sensor element in order to define new sensor pairs and to apply a fallback rule set based on the new groupings.

For example, a current rule set may be shifted partly or completely to the rule set described in conjunction with FIGS. 3A and 3B, which uses two sensor elements to generate a single differential measurement signal.

Figure 8A:
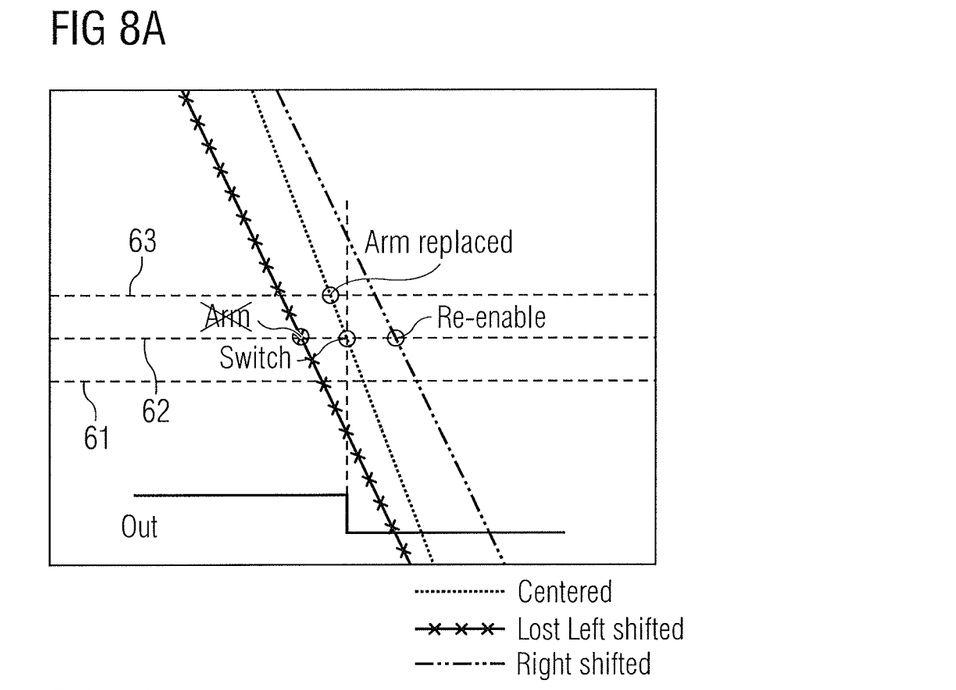
FIGS. 8A and 8B illustrate another a diagram of three differential measurement signals generated by a magnetic speed sensor according to one or more embodiments.
Figure 8B:
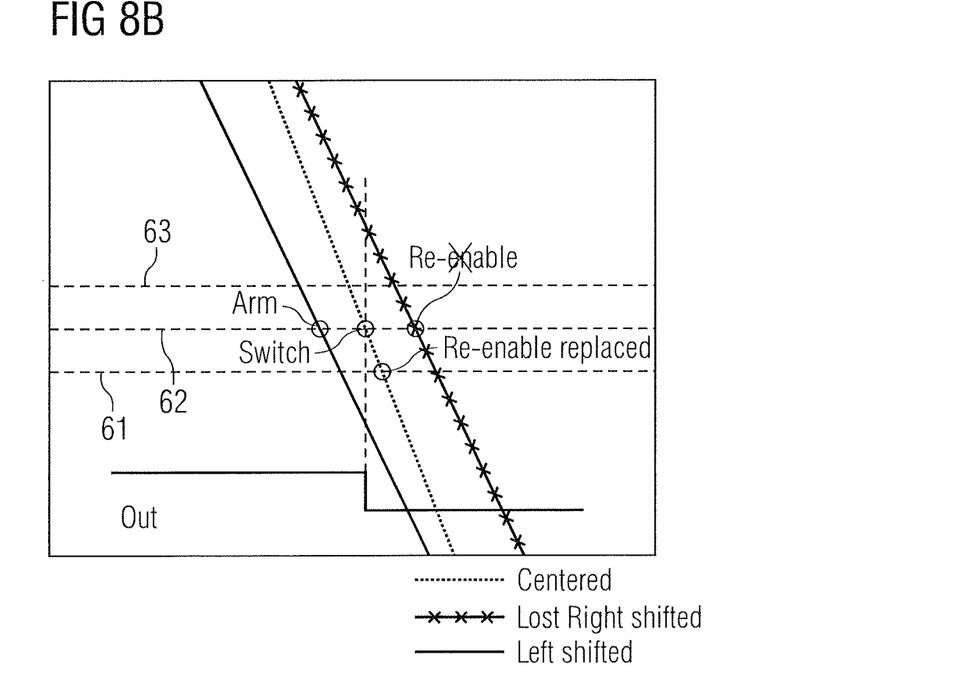

FIGS. 8A and 8B illustrate another example of three differential measurement signals generated by a magnetic speed sensor according to one or more embodiments. In particular, FIGS. 8A and 8B illustrate scenarios in which one of the measurement signals is lost due to a failure, and a modified rule set is implemented by the sensor circuit, replacing the current rule set. For example, one switching rule in the current rule set may be replaced with another switching rule to form the modified rule set. Accordingly, the sensor circuit may autonomously detect a failed measurement signal, determine which remaining measurements signals are still valid (or which sensor elements are still operational), and select a fallback rule set that corresponds to the remaining valid measurement signals (or still operating sensor elements). Thus, multiple rule sets may be stored, each rule set corresponding to a different combination of operating sensor element pairs or a different combination of valid measurement signals. Each rule set may also be assigned a priority such that a rule set with a higher priority is implemented before a rule set of lower priority, and there may be multiple levels of fallback rule sets implemented by the sensor circuit as one or more failures occur over time.

For example, in FIG. 8A, the left-shifted measurement signal is lost and can no longer be used to arm the switching mechanism. Thus, a fallback rule set may be implemented in which the center measurement signal replaces the arming function such that the switching mechanism is armed when the center measurement signal crosses the upper hysteresis threshold 63 on a falling edge. The output is still switched and the switching mechanism disarmed when the center measurement signal crosses the switching threshold 62 on a falling edge. Furthermore, the switching mechanism is re-enabled into a ready state when the right-shifted measurement signal crosses the switching threshold 62 on a falling edge.

Alternatively, in FIG. 8B, the right-shifted measurement signal is lost and can no longer be used to re-enable the switching mechanism. Thus, a fallback rule set may be implemented in which the left-measurement signal still arms the switching mechanism and the output is still switched and the switching mechanism disarmed when the center measurement signal crosses the switching threshold 62 on a falling edge. However, the crossing of the center measurement signal at the lower hysteresis threshold 61 on a falling edge re-enables the switching mechanism.

Alternatively, a fallback operation may include keeping the thresholds active but choose them in a way that they are reached later than the zero crossing of the phase shifted magnetic field sensor signals. Then, wait for whatever occurs first, a phase shifted zero crossing detection signal or a crossing of the arm/enable threshold.

In the event that the center measurement signal is lost and can no longer be used to switch the output and disarm the switching mechanism, the sensor circuit may be configured to determine a new switching point based on an average of the left-shifted and right-shifted measurement signals. In particular, the new switching point may be calculated by determining an average between the remaining two pairs to create an estimate for the center position.

Alternatively, the switching point may be configured to switch to one direction (e.g., on a rising or a falling edge) with the first signal and the opposite direction (e.g., on a falling or a rising edge) with the other, delivering an asymmetric signal based on any of the two remaining valid signals.

In addition, the sensor circuit may be configured to detect a rotation direction of the encoder by detecting the rotation direction of the magnetic field. For example, during a configuration phase or a start-up phase, the sensor circuit may detect an order of threshold crossings of the differential measurement signals. The left-shifted, center, and right-shifted measurement signals may cross a threshold (e.g., the switching threshold) in an order depicted in the above figures (e.g., from left-to-right), or may cross in the reverse order (e.g., from right-to-left) depending on the rotation direction of the encoder. Based on the determined order of threshold crossings, the sensor may determine the rotation direction of the encoder.

Based on the detected rotation direction, the sensor circuit may determine which rule(s) or rule set to apply and select those one or more rules or rule set to implement. For example, the rules within a rule set may be rotation direction dependent due to the order of threshold crossings used by the rule set. In one example rule set, the left-shifted measurement signal may be used to arm the switching mechanism, the center measurement signal may be used to switch the output and disarm the switching mechanism, and the right-shifted measurement signal may be used to re-enable the switching mechanism. In another example rule set, this ordering may be reversed to accommodate an opposite rotation direction. Thus, a first set of rule sets may be configured for a clockwise rotation direction and a second sent of rule sets may be configured for a counter-clockwise rotation direction. It will be appreciated that each of the previously described rule sets may have a reversed counterpart.

Furthermore, one rule set may be selected for full operation as a primary rule set when all sensor elements are operational, and another rule set may be selected for fallback operation as a fallback rule set if one or more sensor elements are detected as faulty. This selection process may be based on the detected rotation direction and the number of operating sensor elements and/or number of operating pairs of sensor elements.

In addition, when the sensor signal determines that one or more of differential measurement signals is invalid or that one or more of the sensor elements is faulty, the sensor circuit may output a warning message (e.g., different pulse length, different signal level or warning flag in a status message), and output the warning message to an external device that may be configured to indicate the error to a user. An error may also be detected if the threshold crossings of the differential measurement signals do not regularly appear in the desired order, and a warning message may be issued in response thereto.

Figure 9:
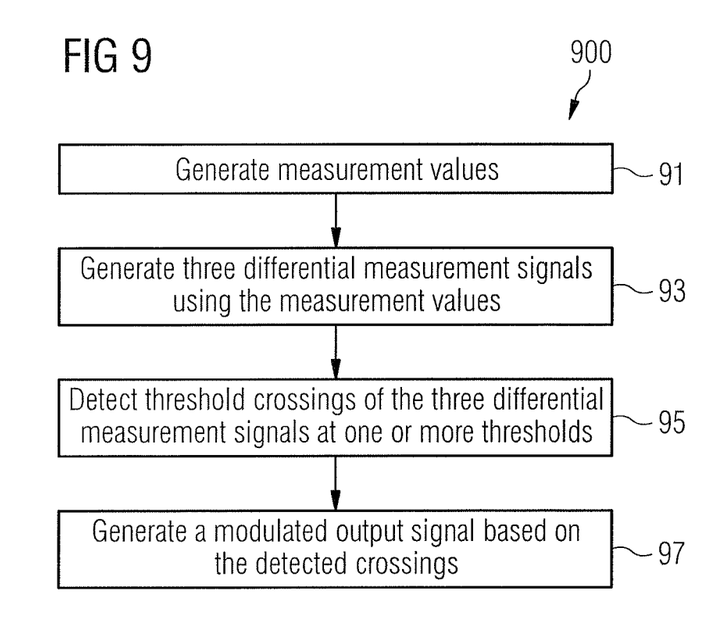
FIG. 9 illustrates a flow diagram of a method of sensing a rotation speed of an encoder according to one or more embodiments.

FIG. 9 illustrates a flow diagram of a method 900 of sensing a rotation speed of an encoder according to one or more embodiments. The method includes generating measurement values by a plurality of sensor elements in response to sensing the magnetic field (operation 91). The method further includes generating three differential measurement signals using the measurement values from the plurality of sensor elements (operation 93). The method further includes detecting crossings at one or more thresholds by the three differential measurement signals (operation 95), and generating an output signal based on the detected crossings (operations 97).

In view of the above, the sensor system may continue to operate in a fallback mode if one of the three sensor pairs is faulty (e.g., stuck at DC, shorted, significantly reduced amplitude). For example, a fallback rule set may be implemented, or a switching point may be phase shifted by the designed distance between the center point of the centered and the shifted sensor pairs. Furthermore, a phase shift is known and defined by a distance between sensor elements, and not by a reference voltage like in the existing hidden hysteresis systems. Therefore, the sensor system can easily be compensated on system level if a fault is detected and can be indicated by a warning.

As noted above, the above examples may be used in any combination unless explicitly stated otherwise. Furthermore, it will be appreciated that other arrangements of sensor elements, other types of encoders, and other rule sets not explicitly described are possible.

While the above embodiments are described in the context of detecting a wheel or camshaft speed, the sensor may be used to detect the rotation speed of any rotating member or object that creates sinusoidal variations in a magnetic field as it rotates and that may be sensed by a sensor. For example, a combination of a ferrous wheel and a back bias magnet may be used to generate a time varying magnetic field. Alternatively, an active encoder wheel (without a back bias magnetic) may be used to generate a time varying magnetic field.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic sensor module configured to measure a magnetic field whose magnitude oscillates between a first extrema and a second extrema, the magnetic sensor module comprising:

a magnetic sensor including a plurality of sensor elements configured to generate measurement values in response to sensing the magnetic field, wherein the plurality of sensor elements are grouped into a first shifted pair, a central pair, and a second shifted pair; and a sensor circuit configured to receive the measurement values from the plurality of sensor elements, generate a first shifted differential measurement signal based on the measurement values received from the first shifted pair, a central differential measurement signal based on the measurement values received from the central pair, and a second shifted differential measurement signal based on the measurement values received from the second shifted pair, and generate an output signal based on detecting the first shifted differential measurement signal, the central differential measurement signal, and the second shifted differential measurement signal crossing at least one threshold.

2. The magnetic sensor module of claim 1, wherein:

the magnetic sensor module is an incremental speed sensor, and the sensor circuit is configured to modulate the output signal according to a rotation speed of an encoder, wherein the crossing of the at least one threshold by the first shifted, central and second shifted differential measurement signals depends on a rotation of the encoder.

3. The magnetic sensor module of claim 1, wherein:

sensor circuit includes at least one calibration unit configured to monitor the first extrema and the second extrema, and adjust the at least one threshold based on an average of the first extrema and the second extrema or adjust an offset applied to one or more of the first shifted differential measurement signal, the central differential measurement signal, and the second shifted differential measurement signal based on an average of the first extrema and the second extrema.

4. The magnetic sensor module of claim 1, wherein the sensor circuit is configured to detect the crossing of the at least one threshold by the first shifted, central and second shifted differential measurement signals based on falling edge crossings or a rising edge crossings.

5. The magnetic sensor module of claim 1, wherein:

sensor circuit includes a switching mechanism configured to change a logic value of the output signal based on the oscillation of the magnetic field, and the sensor circuit is configured to arm, trigger, disarm and re-enable the switching mechanism based on the first shifted, the central and the second shifted differential measurement signals crossing the at least one threshold.

6. The magnetic sensor module of claim 1, further comprising:

a switching mechanism configured to change a logic value of the output signal based on the oscillation of the magnetic field; and a state machine configured to apply a plurality of switching rule sets that provide criteria for arming, disarming and re-enabling the switching mechanism and for changing the logic value of the output signal, wherein the criteria are based on the first shifted, the central and the second shifted differential measurement signals crossing the at least one threshold.

7. The magnetic sensor module of claim 6, wherein:

the sensor circuit is configured to detect an oscillation direction of the magnetic field, and the state machine is configured to apply a rule set from the plurality of rule sets for controlling the switching mechanism based on the detected oscillation direction.

8. The magnetic sensor module of claim 6, wherein:
the sensor circuit is configured to detect an operational state, including a valid state or a faulty state, of each of the plurality of sensor elements, and
the state machine is configured to apply a rule set from the plurality of switching rule sets based on the operational state of each of the plurality of sensor elements.

9. The magnetic sensor module of claim 6, wherein:
the sensor circuit is configured to determine a validity of each of the first shifted, the central and the second shifted differential measurement signals, and
the state machine is configured to apply a rule set from the plurality of switching rule sets based on the validity of each of the first shifted, the central and the second shifted differential measurement signals.

10. The magnetic sensor module of claim 9, wherein:
the sensor circuit is configured to separately determine whether each of the first shifted, the central and the second shifted differential measurement signals is valid based on crossing three thresholds over a predetermined period.

11. The magnetic sensor module of claim 9, wherein the sensor circuit is configured to determine whether the first shifted, the central and the second shifted differential measurement signals are valid based on a relation of an amplitude of each of the first shifted, the central and the second shifted differential measurement signals compared to each other.

12. The magnetic sensor module of claim 9, wherein the sensor circuit is configured to determine whether the first shifted, the central and the second shifted differential measurement signals are valid based on whether an offset of each of the first shifted, the central and the second shifted differential measurement signals exceeds an offset threshold.

13. The magnetic sensor module of claim 6, wherein:
the plurality of switching rule sets includes a primary rule set and a fallback rule set, and
the state machine is configured to implement the primary rule set when all of the plurality of sensor elements are operating normally, and implement the fallback rule set when at least one sensor element of the plurality of sensor elements is faulty.

14. The magnetic sensor module of claim 1, wherein:
the sensor circuit includes a switching mechanism configured to change a logic value of the output signal based on the oscillation of the magnetic field,
the at least one threshold includes a switching threshold, and
the sensor circuit is configured to arm the switching mechanism in response to detecting the first shifted differential measurement signal crossing the switching threshold, change the logic value of the output signal and disarm the switching mechanism in response to detecting the central differential measurement signal crossing the switching threshold, and re-enable the switching mechanism in response to detecting the second shifted differential measurement signal crossing the switching threshold.

15. The magnetic sensor module of claim 14, wherein the sensor circuit is configured to re-enable the switching mechanism on a condition that a maximum or a minimum of a valid one of the first shifted, the central or the second shifted differential measurement signals is detected.

16. The magnetic sensor module of claim 1, wherein:
the sensor circuit includes a switching mechanism configured to change a logic value of the output signal based on the oscillation of the magnetic field,
the at least one threshold includes a hysteresis threshold and a switching threshold, and
the sensor circuit is configured to arm the switching mechanism in response to detecting the central differential measurement signal crossing the hysteresis threshold, change the logic value of the output signal and disarm the switching mechanism in response to detecting the central differential measurement signal crossing the switching threshold, and re-enable the switching mechanism in response to detecting the second shifted differential measurement signal crossing the switching threshold.

17. The magnetic sensor module of claim 1, wherein:
the sensor circuit includes a switching mechanism configured to change a logic value of the output signal based on the oscillation of the magnetic field,
the at least one threshold includes a hysteresis threshold and a switching threshold, and
the sensor circuit is configured to arm the switching mechanism in response to detecting the first shifted differential measurement signal crossing the switching threshold, change the logic value of the output signal and disarm the switching mechanism in response to detecting the central differential measurement signal crossing the switching threshold, and re-enable the switching mechanism in response to detecting the central differential measurement signal crossing the hysteresis threshold.

18. The magnetic sensor module of claim 1, wherein, on a condition that the central differential measurement signal is invalid, the sensor circuit is configured to generate the output signal based on an interpolated center signal generated from an average of the first and the second shifted differential measurement signals.

19. The magnetic sensor module of claim 1, wherein, on a condition that one of the first shifted, the central and the second shifted differential measurement signals is invalid, the sensor circuit is configured to generate the output signal based on asymmetrical shifting of valid ones of the first shifted, the central and the second shifted differential measurement signals.

20. The magnetic sensor module of claim 1, wherein the plurality of sensor elements are linearly arranged.

21. The magnetic sensor module of claim 20, wherein sensor elements of the central pair are symmetrically arranged with respect to a geometrical center, sensor elements of the first shifted pair are asymmetrically arranged with respect to the geometrical center according to a first asymmetrical shift, and sensor elements of the second shifted pair are asymmetrically arranged with respect to the geometrical center according to a second asymmetrical shift.

22. The magnetic sensor module of claim 21, wherein the first asymmetrical shift and the second asymmetrical shift are shifted in opposite directions with respect to the geometrical center.

* * * * *